United States Patent
Wen et al.

(10) Patent No.: US 9,198,052 B2
(45) Date of Patent: Nov. 24, 2015

(54) APPARATUS AND METHOD FOR TRANSMITTING DATA TO A WIRELESS COMMUNICATION DEVICE TO MINIMIZE CONGESTION AND INTERFERENCE FROM UNDETECTABLE DEVICES THROUGH CARRIER SENSING

(71) Applicant: FUJITSU LIMITED, Kawasaki-shi, Kanagawa (JP)

(72) Inventors: Yun Wen, Kawasaki (JP); Hiroshi Fujita, Yokosuka (JP); Makoto Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 46 days.

(21) Appl. No.: 13/659,089

(22) Filed: Oct. 24, 2012

(65) Prior Publication Data

US 2013/0148507 A1 Jun. 13, 2013

(30) Foreign Application Priority Data

Dec. 9, 2011 (JP) ................................. 2011-270634

(51) Int. Cl.
*H04W 24/00* (2009.01)
*H04W 40/00* (2009.01)
(Continued)

(52) U.S. Cl.
CPC .............. *H04W 24/00* (2013.01); *H04W 40/00* (2013.01); *H04W 40/22* (2013.01); *H04W 40/30* (2013.01); *H04W 40/12* (2013.01); *H04W 84/18* (2013.01)

(58) Field of Classification Search
CPC ..... H04W 4/021; H04W 24/02; H04W 24/08; H04W 24/10; H04W 28/08; H04W 28/18; H04W 28/26; H04W 40/02; H04W 48/16; H04W 52/0212; H04W 52/0216; H04W 56/001; H04W 72/02; H04W 72/04; H04W 72/082; H04W 72/085; H04W 72/0446; H04W 74/04; H04W 74/0816; H04W 84/12; H04W 88/08; H04L 1/0026; H04L 5/0073; H04L 12/2602; H04L 43/08; H04L 43/0829; H04L 43/0894; H04L 47/10; H04L 47/12; H04B 15/00

USPC ......... 370/235, 252, 392, 389, 230, 254, 352, 370/474, 229, 231, 232, 236, 251, 259, 328, 370/329; 709/226, 202, 245; 455/440, 455/452.2

See application file for complete search history.

(56) References Cited

U.S. PATENT DOCUMENTS 7,920,536 B1* 4/2011 Kunz et al. ..................... 370/338
2004/0196814 A1* 10/2004 Soderkvist et al. ........... 370/337
(Continued)

FOREIGN PATENT DOCUMENTS

JP 2007-028500 2/2007
JP 2008-227854 9/2008
(Continued)

OTHER PUBLICATIONS

M. Allman, et al. "TCP Congestion Control" Network Working Group, Request for Comments: 5681, Obsoletes: 2581, Category: Standards Track, Sep. 2009.
(Continued)

*Primary Examiner* — Benjamin H Elliott, IV
*Assistant Examiner* — Eric Nowlin
(74) *Attorney, Agent, or Firm* — Katten Muchin Roseman LLP

(57) ABSTRACT

An apparatus estimates an influence rate at which transmission of data to a first wireless communication device is influenced by a second wireless communication device that is undetectable by means of carrier sense. The apparatus determines transmission quantity based on the estimated influence rate, and detects a congestion state of the first wireless communication device. The apparatus transmits data to the first wireless communication device according to the determined transmission quantity when congestion for the first wireless communication device is detected.

8 Claims, 10 Drawing Sheets

(51) Int. Cl.
*H04W 40/12* (2009.01)
*H04W 84/18* (2009.01)
*H04W 40/30* (2009.01)
*H04W 40/22* (2009.01)

(56) References Cited

U.S. PATENT DOCUMENTS

2006/0109787 A1* 5/2006 Strutt et al. .................. 370/235
2006/0165036 A1* 7/2006 Chandra et al. ............. 370/329
2007/0110098 A1* 5/2007 Hart et al. .................... 370/464
2007/0242621 A1* 10/2007 Nandagopalan et al. ..... 370/254
2010/0049819 A1 2/2010 Hamada et al.
2010/0087220 A1* 4/2010 Zheng et al. .................. 455/522
2011/0075578 A1* 3/2011 Kim et al. ..................... 370/252
2012/0155260 A1* 6/2012 Vasseur et al. ............. 370/230.1
2012/0320768 A1* 12/2012 Shaffer et al. ................ 370/252

FOREIGN PATENT DOCUMENTS

JP 2010-233187 10/2010
WO 2008/099716 8/2008

OTHER PUBLICATIONS

Office Action of Japanese Patent Application No. 2011-270634 dated May 26, 2015 with Partial Translation.

* cited by examiner

| RANK | AVERAGE RECEIVED POWER (dBm) | DECREASED NUMBER FOR CONGESTION (PACKETS) | INCREASED NUMBER FOR NON-CONGESTION (PACKETS) |
|---|---|---|---|
| 1 (GOOD) | > n | 1 | 3 |
| 2 (POOR) | ≤ n | 3 | 1 |

FIG. 10

| RANK | DISTANCE (m) | DECREASED NUMBER FOR CONGESTION (PACKETS) | DECREASE DELAY TIME FOR CONGESTION (s) | INCREASED NUMBER FOR NON-CONGESTION (PACKETS) | INCREASE DELAY TIME FOR NON-CONGESTION (s) |
|---|---|---|---|---|---|
| 1 (GOOD) | < d | 1 | T | 3 | 0 |
| 2 (POOR) | ≥ d | 3 | 0 | 1 | T |

APPARATUS AND METHOD FOR TRANSMITTING DATA TO A WIRELESS COMMUNICATION DEVICE TO MINIMIZE CONGESTION AND INTERFERENCE FROM UNDETECTABLE DEVICES THROUGH CARRIER SENSING

CROSS-REFERENCE TO RELATED APPLICATION

This application is based upon and claims the benefit of priority of the prior Japanese Patent Application No. 2011-270634, filed on Dec. 9, 2011, the entire contents of which are incorporated herein by reference.

FIELD

The embodiments discussed herein are related to apparatus and method for transmitting data to a wireless communication device.

BACKGROUND

In the past, to avoid a collision of data which are transmitted from wireless stations in a wireless network, it has been checked by means of carrier sense whether or not there exists a vacancy in a channel. For example, each wireless station performs carrier sense before data transmission, and, when power greater than or equal to a threshold value is detected, each wireless station determines that the channel is in a busy state and stops transmission. On the other hand, when power smaller than the threshold value is detected, each wireless station determines that the channel is in an idle state and starts transmission.

However, even when carrier sense is performed, a collision of data that is undetectable by means of carrier sense may occur between wireless stations, resulting in decrease in the success rate of transmission. For example, when a transmitting wireless station transmits data to a receiving wireless station, a collision of data occurs between the transmitting wireless station and a wireless station that is located within a communication range of the receiving wireless station and is unable to detect transmission performed by the transmitting wireless station by means of carrier sense. That is, a collision of data occurs between the transmitting wireless station and a wireless station (hereinafter referred to as a hidden terminal) at which received power from the transmitting wireless station is less than or equal to the threshold value. In this case, the same packet is retransmitted to suppress decrease in the rate of successful arrival of data.

However, in a wireless station (hereinafter referred to as a bottleneck wireless station) on which traffic is concentrated, such as a wireless station located at a route of a tree-topology network, a collision of data due to hidden terminals may occur frequently and retransmission of data may be repeated. As a result, traffic is increased, which causes congestion of a network and decreases the rate of successful arrival of data.

As a technology of avoiding such congestion, the technology of uniformly reducing the amount of data to be transmitted when any of the transmitting wireless stations detects congestion and gradually increasing the amount of data to be transmitted when the recovery from congestion is detected is disclosed. Moreover, technology of avoiding congestion is also disclosed in which the probability of occurrence of a collision due to hidden terminals is estimated based on traffic information and the number of wireless stations that are considered as hidden terminals so as to select a wireless station which is less likely to be affected by the hidden terminals and to avoid a wireless station that is likely to cause congestion.

Japanese Laid-open Patent Publication No. 2008-227854 and "TCP Congestion Control", RFC5681, IETF, 2009.9, are examples of related art.

SUMMARY

According to an aspect of the invention, an apparatus estimates an influence rate at which transmission of data to a first wireless communication device is influenced by a second wireless communication device that is undetectable by means of carrier sense. The apparatus determines transmission quantity based on the estimated influence rate, and detects a congestion state of the first wireless communication device. The apparatus transmits data to the first wireless communication device according to the determined transmission quantity when congestion for the first wireless communication device is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of an increase-decrease number table, according to a second embodiment;

DESCRIPTION OF EMBODIMENTS

In the above mentioned related art, there is a problem that the rate of successful arrival of data is low.

For example, according to the technology of adjusting the amount of data to be transmitted, both the amount of data to be transmitted from a wireless station whose transmission data is less likely to collide with the data transmitted from other wireless stations and the amount of data to be transmitted from a wireless station having a slight influence on congestion may be also reduced. Therefore the rate of successful arrival of data is not satisfactorily high. Moreover, since the technology of avoiding a wireless station that is likely to cause congestion is not applicable to an unavoidable wireless station such as a bottleneck wireless station, the rate of successful arrival of data may be low.

Hereinafter, embodiments of a wireless communication device, a wireless communication method, and a computer readable recording medium storing a wireless communication program product will be described with reference to the drawings. It is to be understood that the present disclosure is not limited in any way by the embodiments.

Embodiment 1

General Configuration

Figure 1:
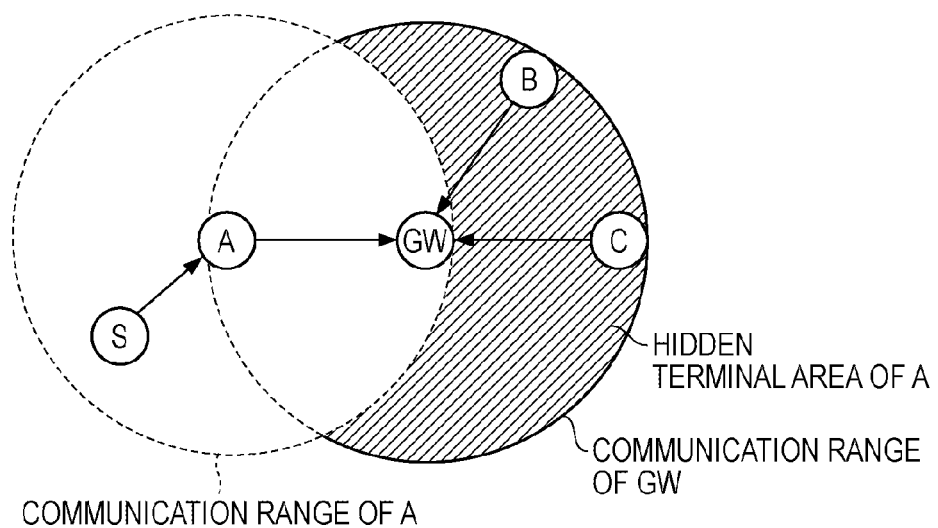
FIG. 1 is a diagram illustrating a configuration example of a wireless communication system, according to a first embodiment.

FIG. 1 is a diagram illustrating a configuration example of a wireless communication system, according to a first embodiment. As illustrated in FIG. 1, the wireless communication system may be configured to include, for example, a wireless communication device A, a wireless communication device B, a wireless communication device C, a wireless communication device S, and a gateway (GW) device, which are communicably coupled to each other. Here, the number of wireless communication devices is not limited to the example described in FIG. 1, and the arbitrary number of wireless communication devices may be implemented.

The wireless communication devices illustrated in FIG. 1 form an ad-hoc network that automatically determines routing information. Each wireless communication device exchanges, using a control packet such as a HELLO message, the routing information held therein with a wireless communication device connected thereto by one hop, in other words, a wireless communication device adjacent to the wireless communication device. Then, each wireless communication device determines a communication channel to the gateway device using the exchanged routing information. Moreover, each wireless communication device has a sensor inside or outside thereof and transmits sensed values to the gateway device. The gateway device is a type of wireless communication device to which a management device collecting sensor values from the wireless communication devices is connected. Here, sensor values include, for example, a temperature value, a humidity value, and acceleration value.

In the wireless communication system illustrated in FIG. 1, the wireless communication devices A, B, and C are located in an area in which a wireless communication device is able to directly communicate with the gateway device, that is, the wireless communication devices A, B, and C are nodes each able to directly transmit data to the gateway device by one hop. The wireless communication device S is located outside the area in which a wireless communication device is able to directly communicate with the gateway device, that is, the wireless communication device S is a multihop node that transmits data to the gateway device via one or more wireless communication device, for example, via the wireless communication device A.

Each wireless communication device avoids a collision of a packet with the packets from other nodes, by performing carrier sense before starting transmission of a data packet to the gateway device and by starting data transmission when the measured received power strength is lower than a threshold value.

For example, the wireless communication device A of FIG. 1 is able to keep track of the state of transmission performed by the wireless communication device S located in a range within which direct communication is possible, by performing carrier sense, thereby avoiding a collision of a packet with a packet from the wireless communication device S. However, even if carrier sense is performed, the wireless communication device A fails to keep track of the state of transmission performed by the wireless communication devices B and C which are located outside a first range in which direct communication with the wireless communication device A is possible and are located inside a second range in which direct communication with the gateway device is possible. As a result, even after performing carrier sense, the wireless communication device A may repeat retransmission due to a collision of a packet with packets from hidden terminals such as the wireless communication devices B and C, causing reduction in the rate of successful arrival of data and congestion in the network.

In such a state, each wireless communication device estimates the influence rate of a wireless communication device that is undetectable by means of carrier sense, on transmission of a data packet to a destination wireless communication device. Then, each wireless communication device determines the amount of transmission (hereinafter also referred to as "transmission quantity") in accordance with the estimated influence rate. When each wireless communication device determines that the destination wireless communication device has been put into a congestion state, the each wireless communication device transmits a data packet to the destination wireless communication device in accordance with the determined transmission quantity.

As described above, in the event of congestion of a destination wireless communication device, each wireless communication device is allowed to perform data transmission at a transmission rate determined in accordance with the influence rate of a hidden terminal. This allows each wireless communication device to suppress decrease in the rate of successful arrival of data by maintaining transmission from a wireless communication device having a slight influence on congestion and reducing transmission from a wireless communication device having a great influence on congestion.

Hardware Configuration of Wireless Communication Device

Next, the hardware configuration of the wireless communication devices illustrated in FIG. 1 will be described. Since the wireless communication devices illustrated in FIG. 1 have the same configuration, each wireless communication device will be described here as a wireless communication device 10.

Figure 2:
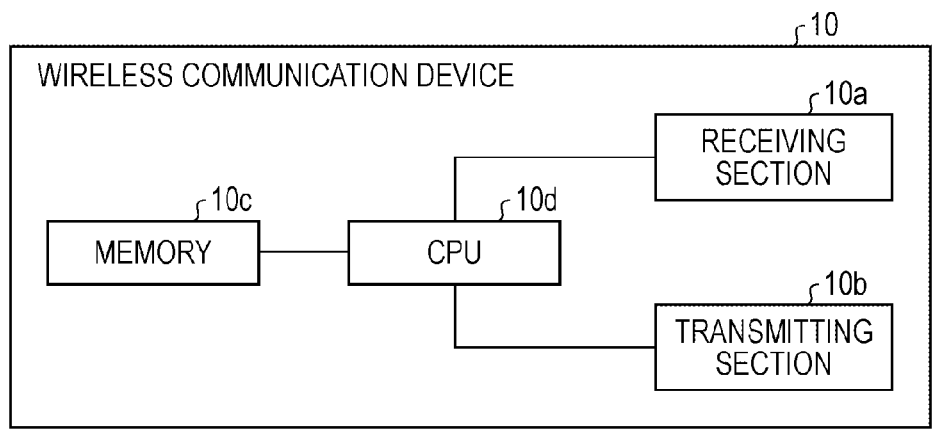
FIG. 2 is a diagram illustrating an example of a hardware configuration of a wireless communication device, according to a first embodiment.

FIG. 2 is a diagram illustrating an example of a hardware configuration of a wireless communication device, according to a first embodiment. As illustrated in FIG. 2, the wireless communication device 10 may be configured to include, for example, a receiving section 10a, a transmitting section 10b, a memory 10c, and a CPU (central processing unit) 10d. The wireless communication device 10 may include hardware other than the hardware illustrated in FIG. 2.

The receiving section 10a is a receiving circuit that is connected to an antenna or the like and receives a control packet and a data packet from other wireless communication devices. The transmitting section 10b is a transmitting circuit that is connected to an antenna or the like and transmits a control packet and a data packet to other wireless communication devices.

The memory 10c is a storage device that stores, for example, program products and routing information. The CPU 10d is a processor that governs the entire processing of the wireless communication device 10. The CPU 10d may execute various processes performing the same functions as those of FIG. 3, which will be described later, by loading the program product stored in the memory 10c.

Functional Blocks of Wireless Communication Device

Figures 3, 4:
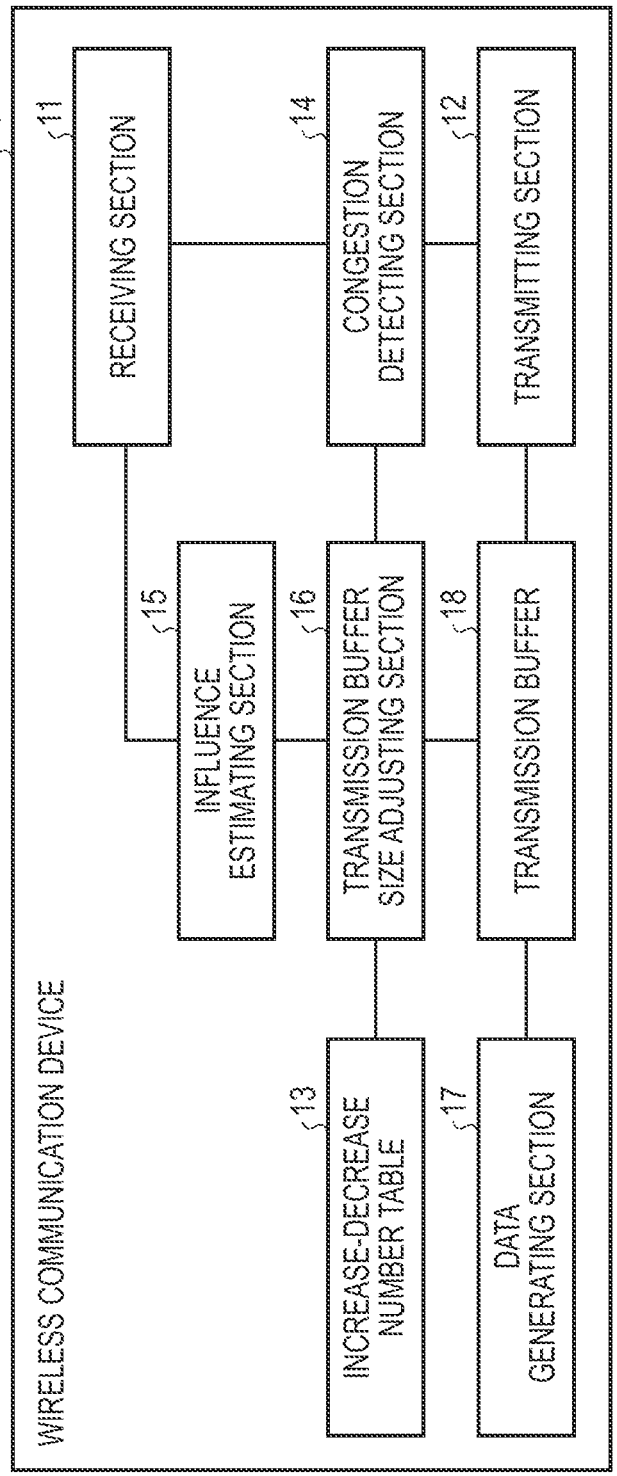
FIG. 3 is a diagram illustrating an example of a functional block diagram of a wireless communication device, according to a first embodiment.
FIG. 4 is a diagram illustrating an example of an increase-decrease number table, according to an embodiment.

FIG. 3 is a diagram illustrating an example of a functional block diagram of a wireless communication device, according to a first embodiment. Since the wireless communication devices illustrated in FIG. 1 have the same configuration, each wireless communication device will be described here as a wireless communication device 10.

As illustrated in FIG. 3, the wireless communication device 10 may be configured to include, for example, a receiving section 11, a transmitting section 12, an increase-decrease number table 13, a congestion detecting section 14, an influence estimating section 15, a transmission buffer size adjusting section 16, a data generating section 17, and a transmission buffer 18. The congestion detecting section 14, the influence estimating section 15, the transmission buffer size adjusting section 16, the data generating section 17 may be processing sections executed by a processor such as a CPU. The increase-decrease number table 13 and the transmission buffer 18 may be provided in a storage device such as a memory or a hard disk.

The receiving section 11 is a processing section that receives a control packet such as a HELLO message, for example, from neighboring wireless communication devices and receives ACKs for various packets transmitted by the transmitting section 12.

The transmitting section 12 is a processing section that transmits a data packet containing a HELLO message and a sensor value to a destination. For example, the transmitting section 12 generates a HELLO message containing routing information at predetermined intervals and transmits the HELLO message to other wireless communication devices by broadcast. Upon receiving, from the gateway device, a packet providing an instruction for data transmission, the transmitting section 12 reads a data packet from the transmission buffer 18 and transmits the data packet to the gateway device. Further, the transmitting section 12 performs carrier sense before transmitting data.

The increase-decrease number table 13 is a storing section storing the number of packets that are to be decreased when congestion is detected and the number of packets that are to be increased when congestion is recovered.

FIG. 4 is a diagram illustrating an example of an increase-decrease number table, according to an embodiment. As illustrated in FIG. 4, the increase-decrease number table 13 stores pieces of information on "a rank", "an average received power value (dBm)", "a decreased number for congestion (packets)", and "an increased number for non-congestion (packets)" in association with each other.

The "rank" stored here is determined based on the average received power and indicates the priority for packet transmission performed by the wireless communication device 10 in a congested state. The "an average received power value (dBm)" indicates the average value of the received power values when the data packet or the HELLO message is received from the gateway device or other wireless communication devices during a predetermined time period. The "decreased number for congestion (packets)" indicates the number of packets that are to be decreased when congestion is detected, and the "increased number for non-congestion (packets)" indicates the number of packets that are to be increased when congestion is recovered.

In the example of FIG. 4, rank 1 (good) corresponds to a case in which the average received power value is greater than n (dBm), and the number of packets is decreased by 1 when congestion is detected, whereas the number of packets is increased by 3 when congestion is recovered. Rank 2 (poor) corresponds to a case in which the average received power value is smaller than or equal to n (dBm), and the number of packets is decreased by 3 when congestion is detected, whereas the number of packets is increased by 1 when congestion is recovered. Here, a case in which two ranks are used has been described. However, the embodiment is not limited thereto, and three or more ranks may be created by breaking up the range of the average received power value into three or more value ranges.

Referring back to FIG. 3, the congestion detecting section 14 is a processing section that detects whether congestion has occurred in a destination wireless communication device or along a route to the destination wireless communication device. For example, the congestion detecting section 14 detects the occurrence of congestion based on an average number of busy states detected by performing carrier sense during a time period for adjusting the amount of transmission or a transmission quantity adjustment period. Then, the congestion detecting section 14 outputs, to the transmission buffer size adjusting section 16, the detection result as to whether or not congestion has occurred.

For example, assume that a data packet has been transmitted to the gateway device three times during a one-minute transmission quantity adjustment period. At the first transmission of a data packet, assume that carrier sense has been performed five times, that is, a busy state has been detected four times by means of carrier sense. Further, at the second transmission of a data packet, assume that carrier sense has been performed two times, that is, a busy state has been detected one time by means of carrier sense. Furthermore, at the third transmission of a data packet, assume that carrier sense has been performed six times, that is, a busy state has been detected five times by means of carrier sense. In this case, the congestion detecting section 14 determines by calculation that the average number of busy states detected at one data transmission operation is "(4+1+5)/3=3.333 . . . ". Then, the congestion detecting section 14 determines that congestion has occurred because the calculated average number of the detected busy states "3.3" is greater than a threshold value "3".

The influence estimating section 15 is a processing section that estimates the influence rate of a wireless communication device undetectable by means of carrier sense, on data transmission to the destination wireless communication device. For example, the influence estimating section 15 calculates, as the influence rate, an average value of received power values that are detected for a wireless link connected to a destination wireless communication device during a transmission quantity adjustment period. Then, the influence estimating section 15 outputs, as the estimated influence rate, the calculated average value of the received power values to the transmission buffer size adjusting section 16.

For example, assume that the influence estimating section 15 receives, from the gateway device, an acknowledgement (ACK) responsive to a data packet, three times during a one-minute transmission quantity adjustment period. In this case, the influence estimating section 15 measures received power (RSSI: received signal strength indication) when the first acknowledgement (ACK) is received. Likewise, the influence estimating section 15 measures received power when the second ACK is received and received power when the third ACK is received. Then, the influence estimating section 15 calculates the average value of three values of the measured received power and outputs the average value to the transmission buffer size adjusting section 16. As a method for measuring received power, known technologies may be used, and therefore descriptions thereof will be omitted here.

The transmission buffer size adjusting section 16 is a processing section that determines the amount of transmission in accordance with the influence rate estimated by the influence estimating section 15. For example, the transmission buffer size adjusting section 16 determines whether or not an average received power value input from the influence estimating section 15 is greater than a threshold value (n). When the average received power value is greater than the threshold value (n), the transmission buffer size adjusting section 16 determines the rank of the influence rate to be 1 (good). When the average received power value is smaller than or equal to the threshold value (n), the transmission buffer size adjusting section 16 determines the rank of the influence rate to be 2 (poor). The transmission buffer size adjusting section 16 determines the rank of the influence rate based on the information illustrated in FIG. 4.

Moreover, the transmission buffer size adjusting section 16 may be configured as a processing section that reduces the amount of transmission of data packets based on the determined transmission quantity when the congestion detecting section 14 detects congestion. For example, assume that the transmission buffer size adjusting section 16 receives, from the congestion detecting section 14, notification indicating the detection of congestion, in a state in which the rank is determined to be rank 2. In this case, the transmission buffer size adjusting section 16 determines that the number of packets that are to be decreased when congestion is detected is "3" by referring to the increase-decrease number table 13. Then, the transmission buffer size adjusting section 16 controls storing packets into the transmission buffer 18 by using, as a new maximum number of stored packets, a value "X−3" obtained by subtracting 3 from the maximum number of stored packets "X" for the transmission buffer 18. For example, the transmission buffer size adjusting section 16 controls storing packets into the transmission buffer 18 by the data generating section 17 so that the number of stored packets does not exceed the maximum number of stored packets "X−3" even when there is free space in the transmission buffer 18. In the case, the transmission buffer size adjusting section 16 discards excess packets that have failed to be stored in the transmission buffer 18.

Moreover, the transmission buffer size adjusting section 16 may be configured as a processing section that increases the amount of transmission of data packets based on the determined transmission quantity when the congestion detecting section 14 detects the recovery from congestion. For example, assume that the transmission buffer size adjusting section 16 receives, from the congestion detecting section 14, notification indicating the recovery from congestion, in a state in which the rank is determined to be rank 2. In this case, the transmission buffer size adjusting section 16 determines that the number of packets to be increased when congestion is recovered is 1 by referring to the increase-decrease number table 13. The transmission buffer size adjusting section 16 increases the number of packets that are allowed to be stored in the transmission buffer 18, by 1 at each of predetermined timings, from the limited maximum number of stored packets "X−3" to the maximum number of stored packets "X". In the case, the predetermined timings may be arbitrarily set. For example, the number of packets that are allowed to be stored in the transmission buffer 18 may be increased every time a packet is stored in the transmission buffer 18 or at intervals of 20 ms.

In the example mentioned above, the number of packets which are stored in the transmission buffer 18 is limited. However, the embodiment is not limited thereto. For example, the transmission buffer size adjusting section 16 may be configured to limit the capacity of the buffer. In this case, for example, when the buffer size of the transmission buffer 18 is "Z" and the size of one packet is "A", the transmission buffer size adjusting section 16 sets the buffer size of the transmission buffer 18 at "Z−A×3". Then, the transmission buffer size adjusting section 16 may control storing packets into the transmission buffer 18 by the data generating section 17 so that the buffer size does not exceed "Z−A×3".

Referring back to FIG. 3, the data generating section 17 is a processing section that generates a data packet and stores the generated data packet into the transmission buffer 18. For example, the data generating section 17 obtains a sensor value from the internal or external sensor of the wireless communication device 10, generates a packet having the obtained sensor value as data, and stores the generated packet in the transmission buffer 18. The transmission buffer 18 may be configured as a storage device that holds the data packet generated by the data generating section 17.

Flow of Processing

Next, the flow of processing performed by a wireless communication device according to a first embodiment will be described. Here, a processing sequence performed by the wireless communication device and buffer size determination processing will be described.

Sequence

Figure 5:
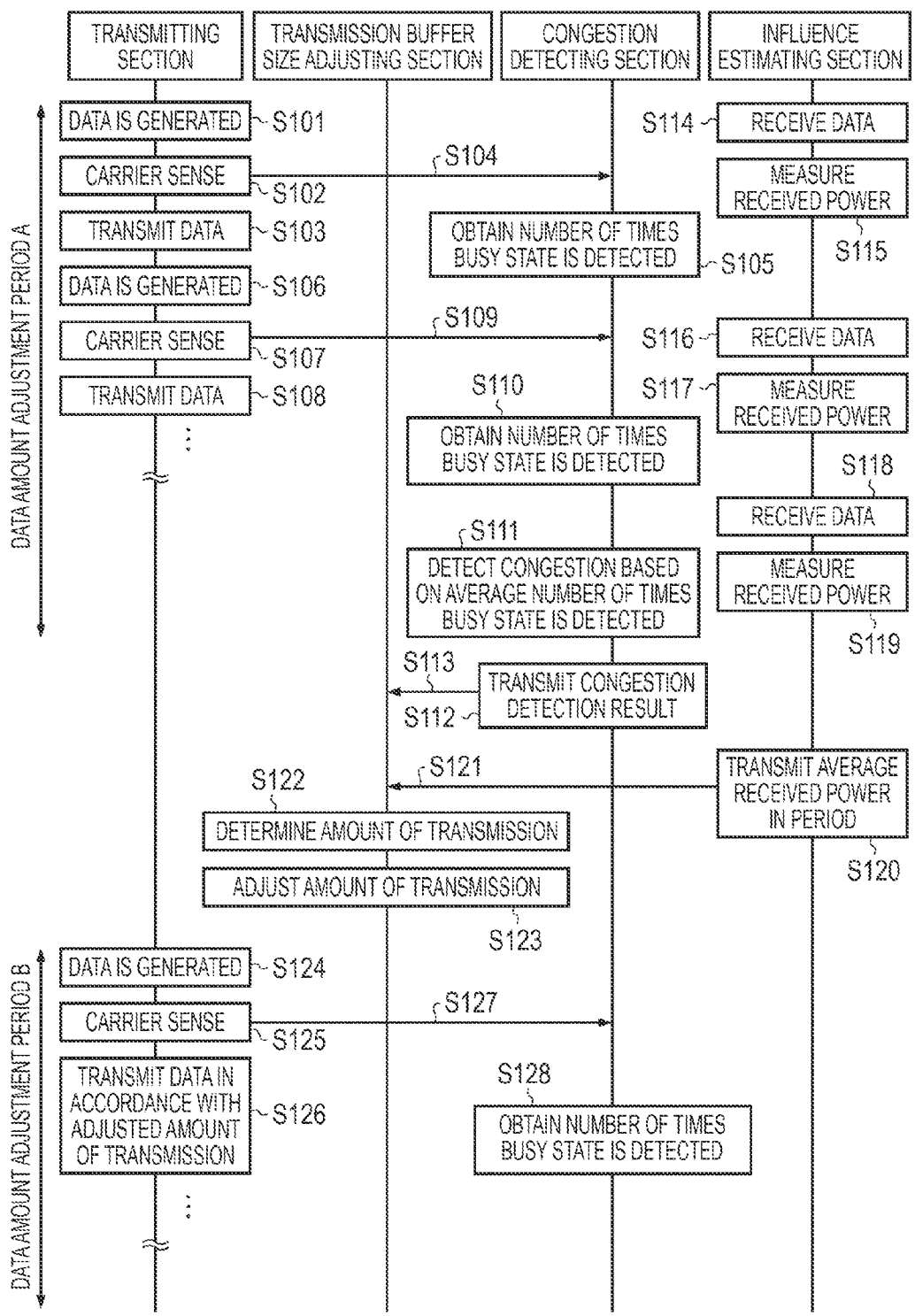
FIG. 5 is a diagram illustrating an example of a sequence of operations performed by a wireless communication device, according to a first embodiment.

FIG. 5 is a diagram illustrating an example of a sequence of operations performed by a wireless communication device, according to a first embodiment.

In operation S101, a data packet is stored in the transmission buffer 18 and data to be transmitted is generated.

In operation S102, the transmitting section 12 of the wireless communication device 10 performs carrier sense.

In operation S103, the transmitting section 12 repeats carrier sense until it is detected that a communication channel is in an idle state, and, when an idle state is detected, the transmitting section 12 transmits the data packet to the gateway device.

Meanwhile, in operations S104 and S105, the congestion detecting section 14 obtains the number of times it has been detected that the communication channel is in a busy state by means of carrier sense performed in S102.

In operation S106, a data packet is stored in the transmission buffer 18 and data to be transmitted is generated, in a manner similar to operation S101.

In operation S107, the transmitting section 12 of the wireless communication device 10 performs carrier sense. The transmitting section 12 repeats carrier sense until it is detected that the communication channel is in an idle state, In operation S108, when an idle state is detected, the transmitting section 12 transmits the data packet to the gateway device.

Meanwhile, in operations S109 and S110, the congestion detecting section 14 obtains the number of times it has been detected that the communication channel is in a busy state by means of carrier sense performed in S107.

In operation S111, the congestion detecting section 14 calculates the average number of times a busy state is detected by means of carrier sense during data quantity adjustment period A. Then, the congestion detecting section 14 detects congestion based on whether or not the calculated average number of times a busy state is detected by means of carrier sense exceeds a threshold value.

In operations S112 and S113, the congestion detecting section 14 transmits the congestion detection result to the transmission buffer size adjusting section 16.

On the other hand, in operations S114 to S119, the influence estimating section 15 measures the received power values detected when various packets are received from the gateway device during the data quantity adjustment period A. In the example of FIG. 5, the influence estimating section 15 receives the packets in operations S114, S116, and S118 and measures the received power values detected when these packets are received.

In operations S120 and S121, the influence estimating section 15 calculates the average value of the received power values detected in S114 to S119 during the data quantity adjustment period A and transmits the calculated average value to the transmission buffer size adjusting section 16.

In operation S122, the transmission buffer size adjusting section 16 refers to the increase-decrease number table 13 by using, as a key, the congestion detection result received from the congestion detecting section 14 and the average received power value received from the influence estimating section 15, and determines the number of packets that are to be increased or decreased, that is, determines the amount of transmission, or transmission quantity.

In operation S123, the transmission buffer size adjusting section 16 adjusts the number of packets that are stored in the transmission buffer 18 so that packet transmission is performed in accordance with the determined transmission quantity. After the amount of transmission is adjusted in this manner, a data quantity adjustment period B starts.

In operation S124, a data packet is stored in the transmission buffer 18 and data to be transmitted is generated.

In operation S125, the transmitting section 12 performs carrier sense. Then, the transmitting section 12 repeats carrier sense until it is detected that the communication channel is in an idle state.

In operation S126, when an idle state is detected, the transmitting section 12 transmits the data packet to the gateway device in accordance with the adjusted transmission quantity.

Meanwhile, in operations S127 and S128, the congestion detecting section 14 obtains the number of times it has been detected that the communication channel is in a busy state by means of carrier sense performed in S125.

As described above, the congestion detecting section 14 performs processing similar to the processing performed in S105, S110, and S111 to S113, during the data quantity adjustment period B after operation S124, and determines whether or not congestion has occurred or congestion has been recovered during the data quantity adjustment period B. Likewise, the influence estimating section 15 performs processing similar to the processing performed in S114 to S120 during the data quantity adjustment period B after operation S124, and calculates the average received power value during the data quantity adjustment period B. Then, the transmission buffer size adjusting section 16 refers to the increase-decrease number table 13 by using, as a key, the determination of congestion and the average received power value obtained during the data quantity adjustment period B, and determines the amount of data to be transmitted at one time during a next data quantity adjustment period C. In this way, the wireless communication device 10 determines the amount of transmission (or transmission quantity) during a next data quantity adjustment period by using the information at the time of data transmission during the current data quantity adjustment period.

Buffer Size Determination Processing

Figure 6:
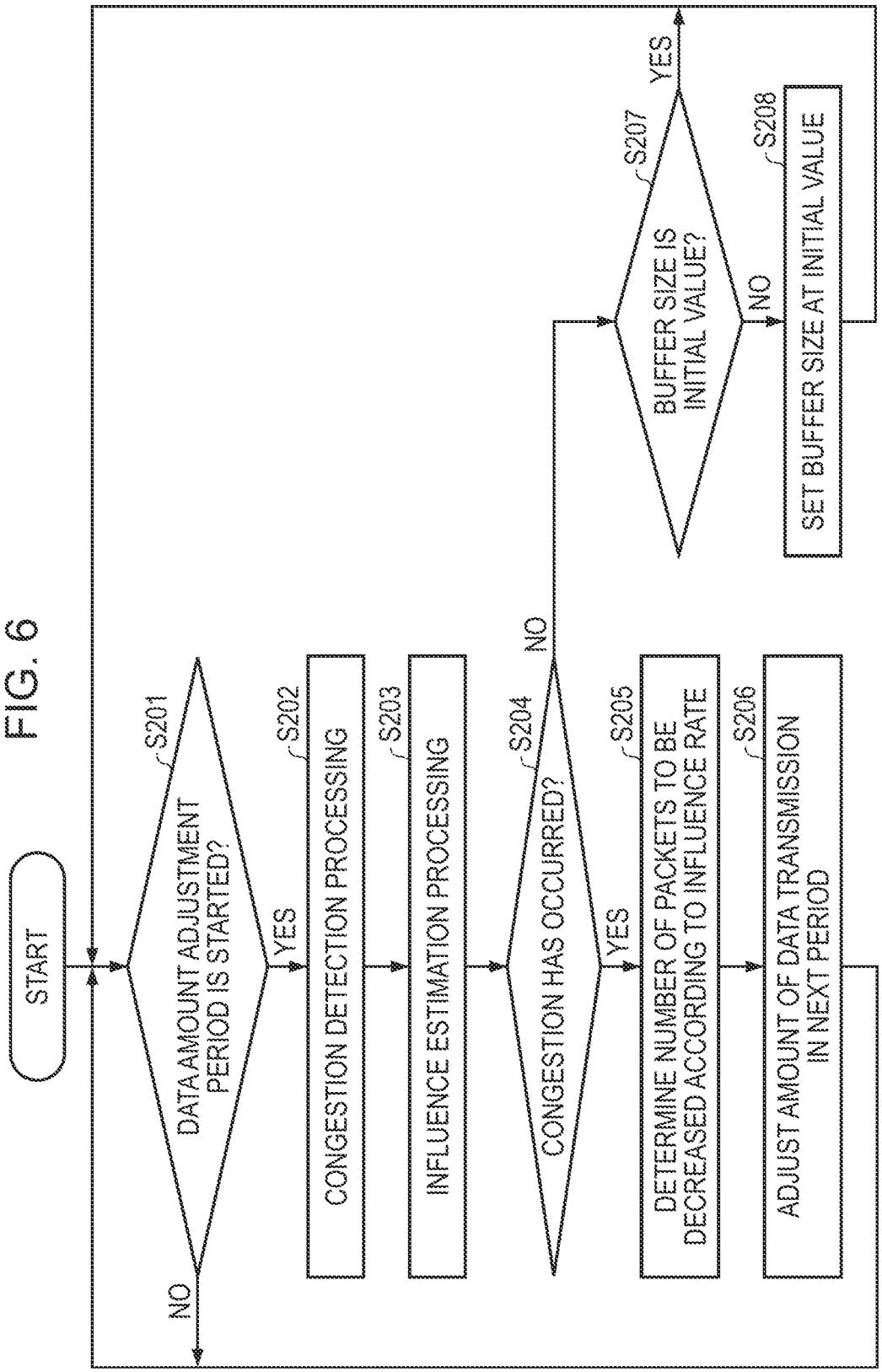
FIG. 6 is a diagram illustrating an example of an operational flowchart for buffer size determination processing, according to an embodiment.

FIG. 6 is a diagram illustrating an example of an operational flowchart for buffer size determination processing, according to an embodiment.

In operation S201, it is determined whether a data amount adjustment period is started or not. When it is determined that the data amount adjustment period is started (YES in operation S201), the congestion detecting section 14 of the wireless communication device 10 performs congestion detection processing (in operation S202). For example, the congestion detecting section 14 calculates the average number of times a busy state is detected by means of carrier sense during the data amount adjustment period and compares the calculated average value with a threshold value, thereby detecting whether congestion has occurred or congestion has recovered. The result of the detection is notified to the transmission buffer size adjusting section 16

In operation S203, the influence estimating section 15 performs influence estimation processing for calculating the average received power value when packets are received from the destination gateway device during the data amount adjustment period.

In operation S204, the transmission buffer size adjusting section 16 determines the result of the detection notified in operation S202. When the transmission buffer size adjusting section 16 is notified of the detection of congestion from the congestion detecting section 14 (YES in operation S204), the transmission buffer size adjusting section 16 determines the number of packets to be decreased in accordance with the influence rate, that is, the average received power value received from the influence estimating section 15, by referring to the increase-decrease number table 13 (in operation S205).

In operation S206, the transmission buffer size adjusting section 16 adjusts the data transmission quantity for a next data amount adjustment period by reducing the buffer size by the determined number of packets that are decreased. Then, the wireless communication device 10 goes back to operation S201 and performs the similar processing.

On the other hand, when the transmission buffer size adjusting section 16 is notified of the recovery from congestion from the congestion detecting section 14 (NO in operation S204), the transmission buffer size adjusting section 16 determines whether or not the current buffer size is an initial value (in operation S207). That is, the transmission buffer size adjusting section 16 determines whether or not the buffer size is the maximum value. When the transmission buffer size adjusting section 16 determines that the current buffer size is an initial value (YES in operation S207), the wireless communication device 10 goes back to operation S201 and performs the same processing.

On the other hand, when the transmission buffer size adjusting section 16 determines that the current buffer size is not an initial value (NO in operation S207), the transmission buffer size adjusting section 16 sets the buffer size at an initial value (in operation S208). In this way, the transmission buffer size adjusting section 16 adjusts the data transmission quantity for a next data amount adjustment period. Thereafter, the wireless communication device 10 goes back to operation S201 and performs the similar processing. In the case, the transmission buffer size adjusting section 16 determines the number of packets that are to be increased based on the increase-decrease number table 13 by using, as a key, the average received power value received from the influence estimating section 15. The transmission buffer size adjusting section 16 may gradually increase the number of packets at predetermined intervals until the buffer size becomes an initial value.

Advantages

As described above, the wireless communication device 10 may measure the congestion status of a destination and the influence rate of hidden terminals, and may reduce the amount of data to be transmitted when congestion has occurred in the data transmission (transfer) destination and increase the amount of data to be transmitted when no congestion has occurred therein. Therefore, the wireless communication device 10 may autonomously adjust the amount of data to be transmitted in accordance with the influence rate of hidden terminals. This allows the wireless communication device 10 to suppress reduction in the rate of successful arrival of data by maintaining data transmission from a wireless communication device having a slight influence on congestion, and reducing data transmission from a wireless communication device having a great influence on congestion.

Here, a case in which the influence rate is great and a case in which the influence rate is slight will be described using examples.

Figure 7:
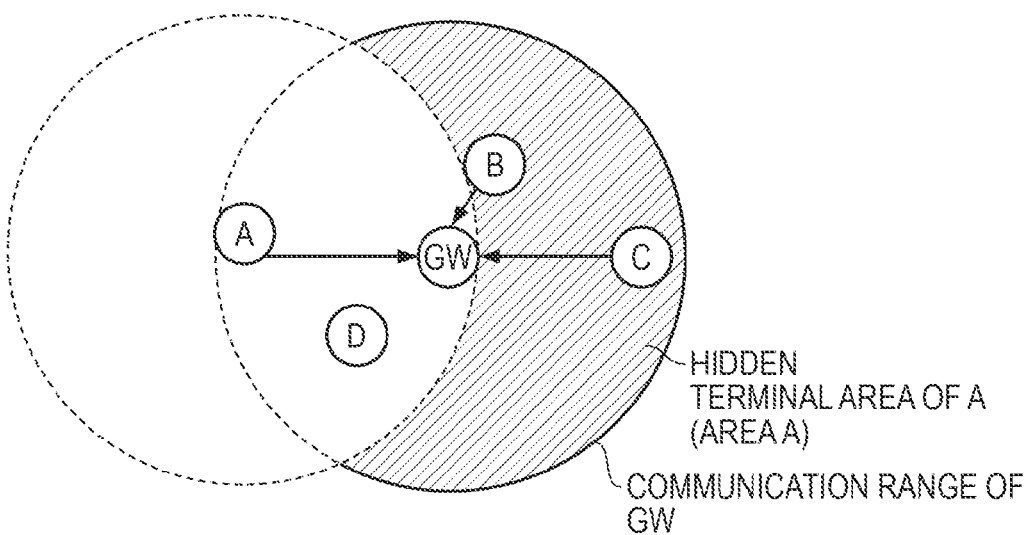
FIG. 7 is a diagram illustrating an example of a wireless communication device having a great influence on congestion, according to an embodiment.
Figure 8:
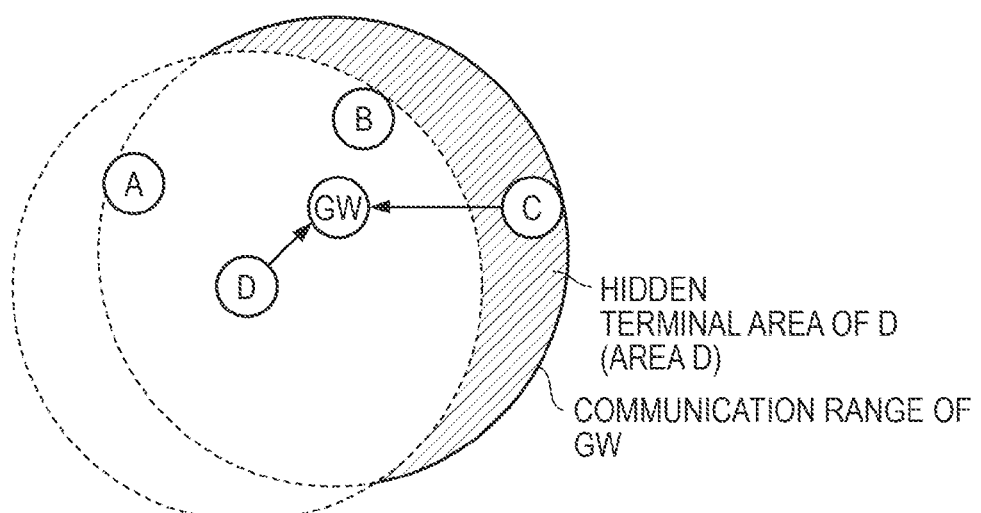
FIG. 8 is a diagram illustrating an example of a wireless communication device having a slight influence on congestion, according to an embodiment.

FIG. 7 is a diagram illustrating an example of a wireless communication device having a great influence on congestion, according to an embodiment. FIG. 8 is a diagram illustrating an example of a wireless communication device having a slight influence on congestion, according to an embodiment. In the case, FIGS. 7 and 8 illustrate examples having the same network configuration and node arrangement.

As illustrated in FIG. 7, when a wireless communication device A transmits a data packet to a gateway device (GW), area A is an area to which the wireless communication device A is unable to perform direct communication and from which direct communication to the gateway device is possible. That is, a hidden terminal area when the wireless communication device A transmits a data packet to the gateway device is the area A in which a wireless communication devices B and C are located, as depicted by diagonally shaded area in FIG. 7.

On the other hand, as illustrated in FIG. 8, when a wireless communication device D transmits a data packet to the gateway device, area D is an area to which the wireless communication device D is unable to perform direct communication and from which direct communication to the gateway device is possible. That is, a hidden terminal area when the wireless communication device D transmits a data packet to the gateway device is the area D in which the wireless communication device C is located, as depicted by diagonally shaded area in FIG. 8.

Based on a comparison between FIG. 7 and FIG. 8, it may be possible to use the distance between a transmitting terminal (for example, A or D) and a receiving terminal (for example, GW) as one indicator for determining the size of the hidden terminal area. In the first embodiment, the distance between the transmitting terminal and the receiving terminal is determined based on the strength of the received power observed when a packet is received from a destination. That is, when a received power value at which a transmitting terminal receives data from a receiving terminal is smaller than or equal to a threshold value, it may be determined that the transmitting terminal (for example, A) is away from the receiving terminal (for example, GW) as illustrated in FIG. 7. On the other hand, when the received power value is greater than the threshold value it may be determined that the transmitting terminal (for example, D) and the receiving terminal (for example, GW) are close to each other, as illustrated in FIG. 8.

Therefore, in FIG. 7 in which the wireless communication device A is away from the gateway device, since a hidden terminal area is large, a great number of hidden terminals may be located in the hidden terminal area. Therefore, it is possible to determine that the influence rate of the hidden terminals is great. On the other hand, in FIG. 8 in which the wireless communication device D is near the gateway device (GW), since a hidden terminal area is small, a small number of hidden terminals may be located in the hidden terminal area. Therefore, it is possible to determine that the influence rate of the hidden terminals is small. As a result, a higher priority is given to transmission of a data packet performed by the wireless communication device D in FIG. 8 in which the influence rate of hidden terminals is smaller than that for transmission of a data packet performed by the wireless communication device A in FIG. 7 in which the influence rate of hidden terminals is great. This allows maintaining transmission from a wireless communication device having a small influence on congestion, thereby keeping a high rate of successful arrival and suppressing decrease in the rate of successful arrival of the entire network.

Embodiment 2

In the first embodiment, the example in which congestion is detected based on the average busy rate of carrier sense, that is, the average number of times a busy state is detected by means of carrier sense during a data quantity adjustment period, has been described; however, the embodiment is not limited thereto. For example, it is also possible to detect congestion based on the success rate of transmission of data packets. Moreover, in the first embodiment, the example in which the transmission quantity is adjusted based on the received power observed when a packet is received from the gateway device which is a destination has been described; however, the embodiment is not limited thereto. For example, it is also possible to adjust the transmission quantity based on position information acquired by using a GPS (global positioning system) or the like.

Thus, in the second embodiment, an example in which congestion is detected based on the success rate of transmission of data packets and the transmission quantity is adjusted based on position information acquired by using a GPS will be described. Here, a sequence of operations according to the second embodiment and buffer size determination processing according to the second embodiment will be described.

Processing Sequence

Figure 9:
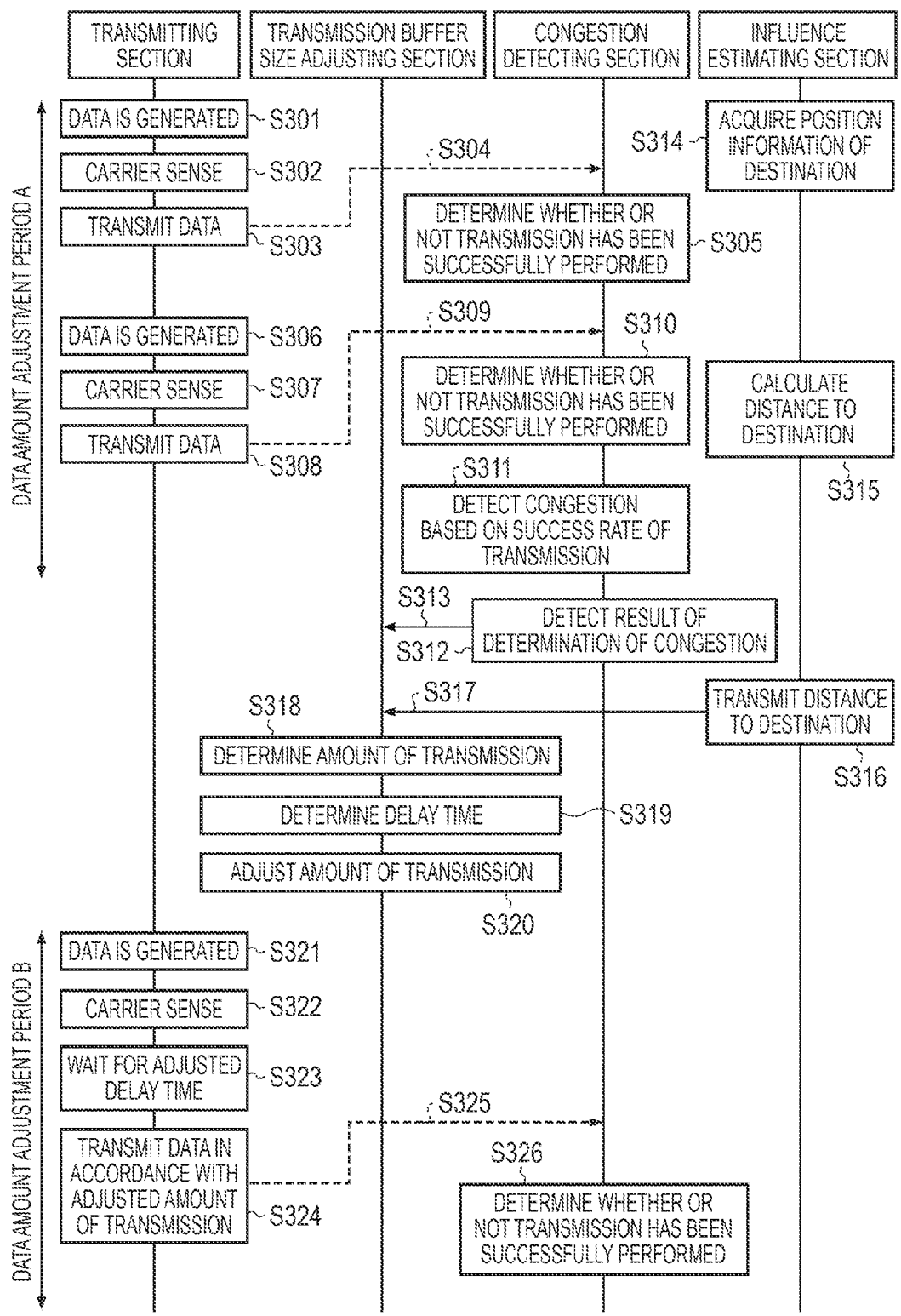
FIG. 9 is a diagram illustrating an example of a sequence of operations performed by a wireless communication device, according to a second embodiment.

FIG. 9 is a diagram illustrating an example of a sequence of operations performed by a wireless communication device, according to a second embodiment.

In operation S301, a data packet is stored in the transmission buffer 18 and data to be transmitted is generated.

In operation S302, the transmitting section 12 of the wireless communication device 10 repeats carrier sense until it is detected that the communication channel is in an idle state.

In operation S303, when an idle state is detected, the transmitting section 12 transmits the data packet to the gateway device.

In operations S304 and S305, the congestion detecting section 14 determines whether or not transmission has been successfully performed by checking whether an ACK is returned from the gateway device in response to the transmission of the data packet performed in operation S303.

In operation S306, a data packet is stored in the transmission buffer 18 and data to be transmitted is generated.

In operation S307, the transmitting section 12 of the wireless communication device 10 repeats carrier sense until it is detected that the communication channel is in an idle state.

In operation S308, when an idle state is detected, the transmitting section 12 transmits the data packet to the gateway device.

In operations S309 and S310, the congestion detecting section 14 determines whether or not transmission has been successfully performed by checking whether an ACK is returned from the gateway device in response to the transmission of the data packet performed in operation S308.

In operation S311, the congestion detecting section 14 calculates the success rate of transmission of the data packets transmitted during the data amount adjustment period A. Then, the congestion detecting section 14 performs determination of congestion by determining whether or not the calculated success rate of transmission is less than a threshold value. For example, when transmission of a data packet has been performed three times and an ACK has been received only once, the congestion detecting section 14 determines by calculation that the success rate of transmission is "⅓=0.333 . . . ". Then, since the success rate of transmission "0.3" is less than a threshold value "1", for example, the congestion detecting section 14 determines that congestion has occurred. The congestion detecting section 14 may perform determination of congestion based on the success rate of transmission not only of data packets but also of all the packets transmitted during the data amount adjustment period.

In operations S312 and S313, the congestion detecting section 14 transmits the determination result to the transmission buffer size adjusting section 16.

Meanwhile, in operation S314, the influence estimating section 15 acquires position information from the gateway device during the data amount adjustment period A. For example, the gateway device transmits a control packet, such as a HELLO message exchanged between the gateway device and the wireless communication device 10, which contains position coordinates obtained by a GPS or the like.

In operation S315, the influence estimating section 15 of the wireless communication device calculates the distance to the gateway device using a position information of the wireless communication device and a position information received from the gateway device.

In operations S316 and S317, the influence estimating section 15 transmits the calculated distance, to the transmission buffer size adjusting section 16.

In operation S318, the transmission buffer size adjusting section 16 determines the number of packets that are to be increased or decreased, that is, the amount of transmission, by referring to the increase-decrease number table 13 using, as a key, the congestion determination result received from the congestion detecting section 14 and the distance received from the influence estimating section 15.

In operation S319, the transmission buffer size adjusting section 16 determines, by referring to the increase-decrease number table 13 using, as a key, the congestion determination result and the distance, a delay time by which the starting time of processing for the increase/decrease of the number of packets is adjusted.

In operation S320, the transmission buffer size adjusting section 16 controls the transmitting section 12 to adjust the number of packets which are stored in the transmission buffer 18, so that packet transmission is performed in accordance with the determined amount of transmission after a lapse of the determined delay time.

In operation S321, the data amount adjustment period B is started after the amount of transmission is adjusted in the above mentioned manner. Thereafter, a data packet is stored in the transmission buffer 18, and data to be transmitted is generated.

In operation S322, the transmitting section 12 repeats carrier sense until it is detected that the communication channel is in an idle state.

In operation S323, when an idle state is detected, the transmitting section 12 waits for the delay time determined in operation S319.

In operation S324, after a lapse of the delay time, the transmitting section 12 transmits the data packet to the gateway device in accordance with the adjusted amount of transmission.

In operations S325 and S326, the congestion detecting section 14 determines whether or not transmission has been successfully performed by checking whether an ACK is returned from the gateway device in response to the transmission of the data packet performed in operation S324.

As described above, the congestion detecting section 14 determines whether congestion has occurred or congestion has recovered during the data amount adjustment period B, by performing processing similar to the processing in operations S305 and S310 during the data amount adjustment period B after operation S321. Moreover, the influence estimating section 15 of a wireless communication device may be configured to calculate the distance between the wireless communication device and the gateway device, by acquiring the position information of the gateway device during the data amount adjustment period B. Then, the transmission buffer size adjusting section 16 of the wireless communication device determines a delay time and the amount of transmission that are used for one data transmission operation during a next data amount adjustment period C, by referring to the increase-decrease number table 13 using, as a key, the determination result of congestion and the distance that are obtained during the data amount adjustment period B. In this way, the wireless communication device 10 determines the amount of transmission, or transmission quantity, during a next data amount adjustment period using information on data transmission during the current data amount adjustment period.

Here, a method for determining the amount of transmission and a delay time will be described with reference to FIG. 10.

FIG. 10 is a diagram illustrating an example of an increase-decrease number table, according to a second embodiment. As illustrated in FIG. 10, the increase-decrease number table stores "a rank", "a distance (m)", "decreased number for congestion (packets)", "a decrease delay time for congestion (s)", "increased number for non-congestion", and "an increase delay time for non-congestion (s)" in association with each other.

The "rank" stored here is determined based on the distance and indicates the degree of priority of packet transmission which is performed by the wireless communication device 10 when congestion is detected. The "distance" indicates the distance between the wireless communication device and a destination device. The "decreased number for congestion (packets)" indicates the number of packets that are to be decreased when congestion is detected. The "decrease delay-time for congestion (s)" indicates the waiting time before starting to decrease the number of packets when congestion is detected. The "increased number for non-congestion (packets)" indicates the number of packets that are to be increased when congestion is recovered. The "increase delay-time for non-congestion (s)" indicates the waiting time before starting to increase the number of packets when congestion is recovered. In this case, the delay time may be set, for example, at a multiple of a measurement period T during which the congestion state and the influence rate of hidden terminals are measured, that is, at a multiple of a data amount adjustment period T.

In the example of FIG. 10, a case in which the distance is smaller than d (m) corresponds to rank 1 (good) indicating that the number of packets is decreased by 1 after a lapse of T second when congestion is detected and the number of packets is increased by 3 without delay when congestion is recovered. Likewise, a case in which the distance is greater than or equal to d (m) corresponds to rank 2 (poor) indicating that the number of packets is decreased by 3 without delay when congestion is detected and the number of packets is increased by 1 after a lapse of T second when congestion is recovered.

As a method for reducing the amount of transmission, a method by which the buffer size is reduced by the amount corresponding to 3 packets after a lapse of T second may be adopted, or a method by which the buffer size is reduced by the amount corresponding to 3 packets every time packet transmission is performed after a lapse of T second may be used. Similarly, as a method for increasing the amount of transmission, a method by which the buffer size is increased by the amount corresponding to 3 packets after a lapse of T second may be adopted, or a method by which the buffer size is increased by the amount corresponding to 3 packets every time packet transmission is performed after a lapse of T second may be used.

Buffer Size Determination Processing

Figure 11:
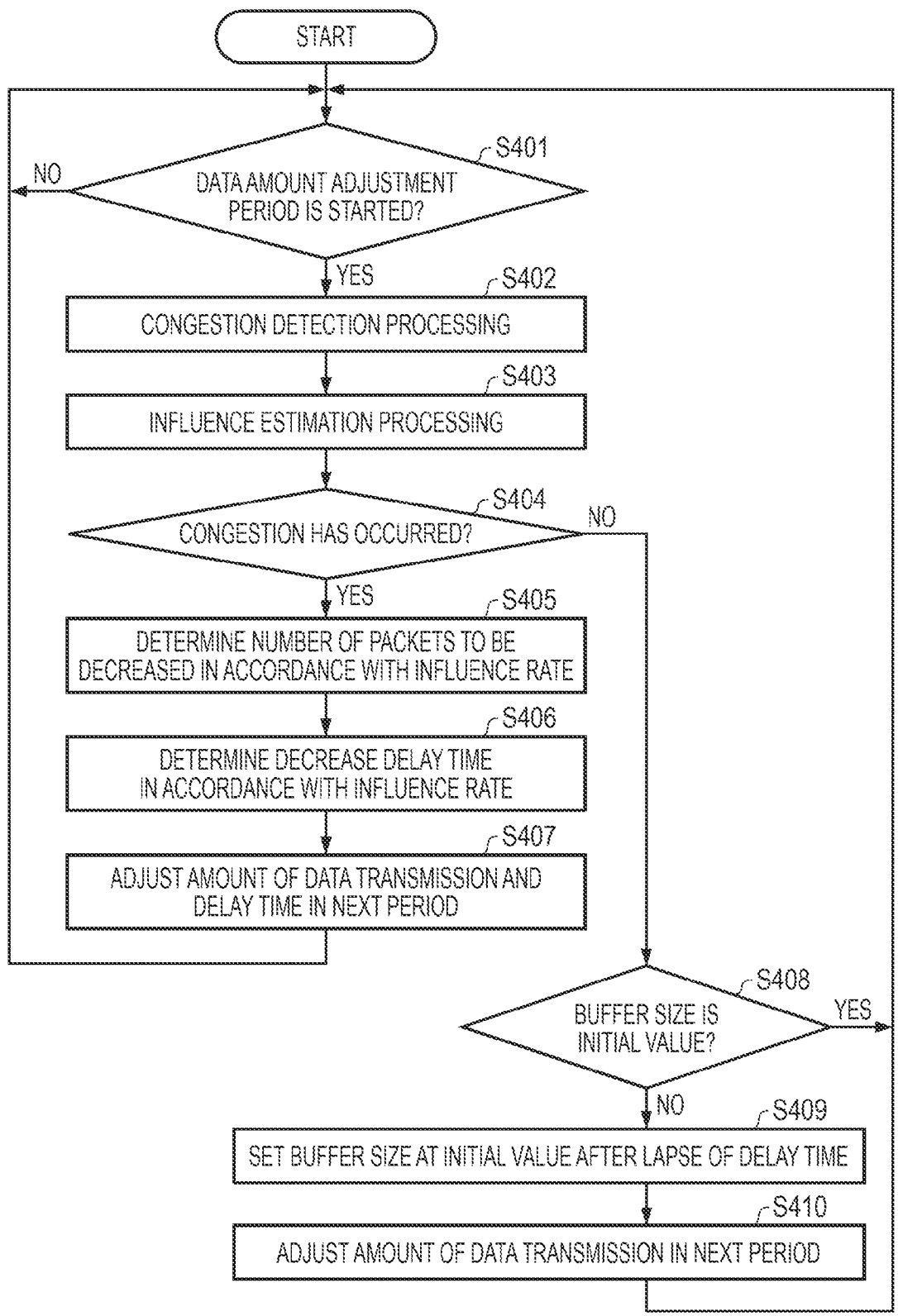
FIG. 11 is a diagram illustrating an example of an operational flowchart for buffer size determination processing, according to a second embodiment.

FIG. 11 is a diagram illustrating an example of an operational flowchart for buffer size determination processing, according to a second embodiment.

In operation S401, it is determined whether a data amount adjustment period is started or not. When a data amount adjustment period is started (YES in operation S401), the congestion detecting section 14 of the wireless communication device 10 performs congestion detection processing. For example, the congestion detecting section 14 detects the occurrence of congestion or the recovery from congestion based on the success rate of transmission of a data packet which has been performed during the data amount adjustment period.

In operation S403, the influence estimating section 15 performs influence estimation processing for calculating, as an influence rate, a distance to the gateway device using the position information received from the destination gateway device and the position information of the wireless communication device.

In operation S404, the transmission buffer size adjusting section 16 determines whether the detection of congestion is notified from the congestion detecting section 14 or not. When the transmission buffer size adjusting section 16 is notified of the detection of congestion from the congestion detecting section 14 (YES in operation S404), the transmission buffer size adjusting section 16 determines the number of packets to be decreased in accordance with the influence rate, that is, the distance received from the influence estimating section 15, by referring to the increase-decrease number table 13 (in operation S405).

In operation S406, the transmission buffer size adjusting section 16 determines a decrease delay time corresponding to the distance received from the influence estimating section 15.

In operation S407, the transmission buffer size adjusting section 16 adjusts the amount of data transmission during a next data amount adjustment period. For example, the transmission buffer size adjusting section 16 reduces the buffer size by the determined number of packets that are to be decreased after a lapse of the determined decrease delay time. Then, the wireless communication device 10 goes back to operation S401 and performs the similar processing.

Meanwhile, when the transmission buffer size adjusting section 16 is notified of the recovery from congestion from the congestion detecting section 14 (NO in operation S404), the transmission buffer size adjusting section 16 determines whether or not the current buffer size is an initial value (in operation S408). When the transmission buffer size adjusting section 16 determines that the current buffer size is an initial value (YES in operation S408), the wireless communication device 10 goes back to operation S401 and performs the similar processing.

On the other hand, when the transmission buffer size adjusting section 16 determines that the current buffer size is not an initial value (NO in operation S408), the transmission buffer size adjusting section 16 sets the buffer size at an initial value after a lapse of the determined increase delay time for non-congestion, defined in the increase-decrease number table 13 (in operation S409).

In operation S410, the transmission buffer size adjusting section 16 adjusts the amount of data transmission during a next data amount adjustment period. Then, the wireless communication device 10 goes back to operation S401 and performs the similar processing.

The wireless communication device 10 according to the second embodiment may estimate the influence rate of hidden terminals based on a distance calculated using position information. This allows the wireless communication device 10 to accurately grasp the area in which the hidden terminals are located and to estimate the influence rate accurately. Moreover, the wireless communication device 10 may perform determination of congestion based on the success rate of packet transmission. That is, since the wireless communication device 10 detects congestion based on whether or not the gateway device receives the packet accurately, the wireless communication device 10 may not only detect congestion but also determine whether or not the gateway device is in a state in which the gateway device is able to receive a packet. This allows packet transmission from the wireless communication device 10 to the gateway device to be more certain and to maintain a high rate of successful arrival.

Embodiment 3

In the embodiments described above, a case in which there is one destination has been described; however, the embodiment is not limited thereto. Even when there are multiple destinations, processing may be performed in the similar way. Thus, in a third embodiment, control which is performed when there exist a plurality of destinations will be described. Since the adjustment of the amount of transmission after the number of packets that are to be decreased is determined is the same as the adjustment performed according to the first and second embodiments, only influence estimation processing and congestion detection processing will be described here. In the third embodiment, a case in which the influence rate is estimated using position information will be described; however, it is also possible to use the method described in the first embodiment.

Influence Estimation Processing

Figure 12:
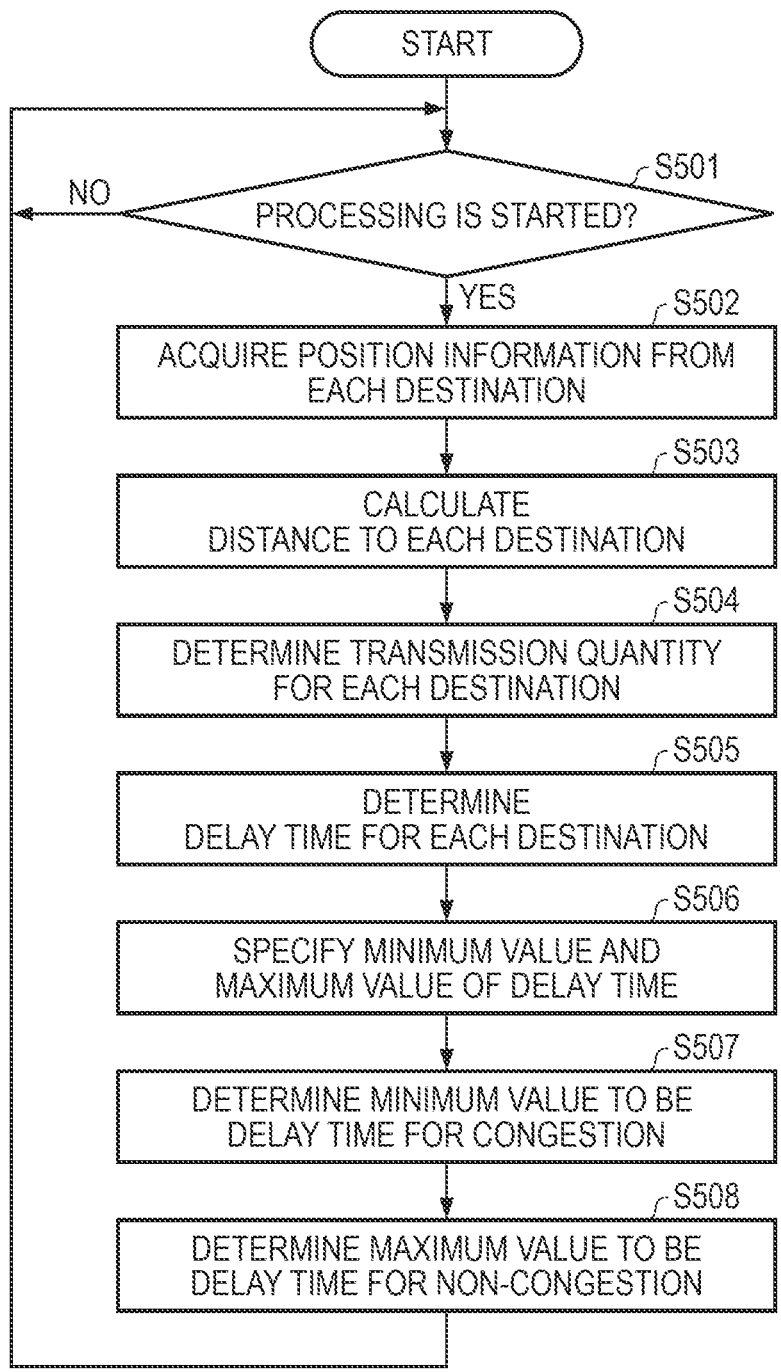
FIG. 12 is a diagram illustrating an example of an operational flowchart for influence estimation processing, according to a third embodiment.

FIG. 12 is a diagram illustrating an example of an operational flowchart for influence estimation processing, according to a third embodiment.

In operation S501, it is determined whether the processing is started or not. When the processing is started (YES in operation S501), the influence estimating section 15 acquires position information from each destination wireless communication device (in operation S502). As a method for acquiring position information, the wireless communication device 10 may transmit a position information acquisition request to each destination, or each destination wireless communication device may transmit a control packet including the position information.

In operation S503, the influence estimating section 15 of a wireless communication device calculates a distance to each destination using the position information acquired from each destination and the position information of the wireless communication device. The influence estimating section 15 transmits, to the transmission buffer size adjusting section 16, the calculated distance between each destination and the wireless communication device.

In operation S504, the transmission buffer size adjusting section 16 determines the amount of transmission for each destination using the distance to each destination. For example, the transmission buffer size adjusting section 16 determines, for each destination, the number of packets to be decreased when congestion is detected and the number of packets to be increased when congestion is recovered, by referring to the increase-decrease number table 13.

In operation S505, the transmission buffer size adjusting section 16 determines a delay time for each destination using the distance to each destination. For example, the transmission buffer size adjusting section 16 determines, for each destination, a decrease delay time for congestion and an increase delay time for non-congestion, by referring to the increase-decrease number table 13.

In operation S506, the transmission buffer size adjusting section 16 identifies a minimum value and a maximum value from among the determined delay times for the plurality of destinations.

In operation S507, the transmission buffer size adjusting section 16 determines the minimum value to be a decrease delay time for congestion.

In operation S508, the transmission buffer size adjusting section 16 determines the maximum value to be an increase delay time for non-congestion. Thereafter, the wireless communication device 10 performs the processing after operation S501 during a next data amount adjustment period.

Congestion Detection Processing

Figure 13:
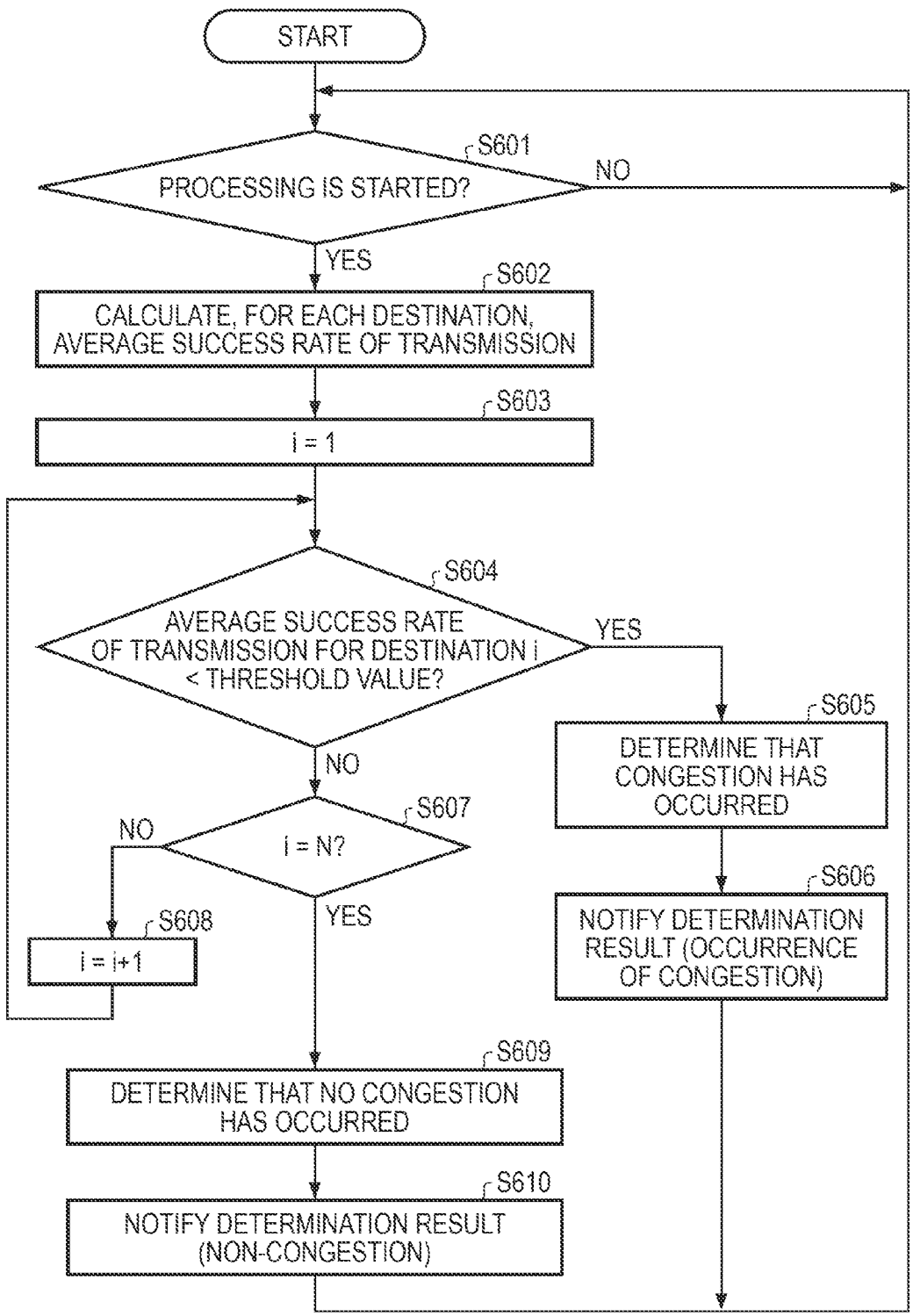
FIG. 13 is a diagram illustrating an example of an operational flowchart for congestion detection processing, according to a third embodiment.

FIG. 13 is a diagram illustrating an example of an operational flowchart for congestion detection processing, according to a third embodiment.

In operation S601, it is determined whether the processing is started or not. When the processing is started (YES in operation S601), the congestion detecting section 14 calculates, for each of a plurality of destinations, an average success rate of transmission (in operation S602).

In operation S603, the congestion detecting section 14 sets variable i at value "1".

In operation S604, the congestion detecting section 14 determines whether or not the average success rate of transmission for destination i (the destination identified by variable i) is smaller than a threshold value. When the congestion detecting section 14 determines that the average success rate of transmission for the destination i is smaller than the threshold value (YES in operation S604), the congestion detecting section 14 determines that congestion has occurred (in operation S605).

In operation S606, the congestion detecting section 14 transmits the determination result indicating the occurrence of congestion to the transmission buffer size adjusting section 16.

On the other hand, when the congestion detecting section 14 determines that the average success rate of transmission of the destination i is greater than or equal to the threshold value (NO in operation S604), the congestion detecting section 14 determines whether or not the value of variable i coincides with N which is the number of the plurality of destinations (in operation S607). When the congestion detecting section 14 determines that the value of variable i does not coincide with N (NO in operation S607), the congestion detecting section 14 increments the variable i by 1 (in operation S608) and performs the processing after operation S604.

On the other hand, when the congestion detecting section 14 determines that the value of variable i coincides with N (YES in operation S607), the congestion detecting section 14 determines that no congestion has occurred (S609). Thereafter, the congestion detecting section 14 transmits the determination result indicating non-congestion to the transmission buffer size adjusting section 16 (in operation S610).

As described above, even when the wireless communication device 10 according to the third embodiment transmits a packet to a plurality of destinations, the wireless communication device 10 may reduce the amount of transmission in accordance with the influence rate when congestion is detected in any destination. Moreover, the wireless communication device 10 may increase the amount of transmission in accordance with the influence rate when congestion is recovered. Therefore, regardless of the number of destinations, the wireless communication device 10 may suppress decrease in the rate of successful arrival of the entire network and maintain a high rate of successful arrival by keeping transmission from a wireless communication device having a slight influence on congestion.

Embodiment 4

While the embodiments have been described, the embodiments may be carried out in manners other than those described above. The followings are embodiments different from the embodiments described above.

Combination of Embodiments

The methods described in the above embodiments may be arbitrarily combined. For example, the influence estimation method using a distance described in the second embodiment and the congestion determination method based on average received power value described in the first embodiment may be used in combination.

Example of Destination

In the embodiments described above, an example in which a gateway device is used as a destination has been described; however, the embodiment is not limited thereto. The same processing may be performed in a case in which an arbitrary wireless communication device is used as a destination.

Method for Adjusting the Amount of Transmission

In the embodiments described above, as a method for adjusting the amount of transmission, the method by which the buffer size of the transmission buffer 18 is controlled by software has been described; however, the embodiment is not limited thereto. For example, the transmission rate at which the transmitting section 12 transmits a packet may be adjusted. For example, when congestion is detected, the transmission buffer size adjusting section 16 may change the transmission rate at which the transmitting section 12 transmits a packet, to a rate which is lower than an initial value. Moreover, when congestion is recovered, the transmission buffer size adjusting section 16 may change the transmission rate at which the transmitting section 12 transmits a packet, back to the initial value.

Furthermore, the wireless communication device 10 may adjust the amount of transmission not only based on the current adjustment period but also based on the state of the past adjustment periods. For example, the wireless communication device 10 increases the amount of transmission only when it is determined that no congestion has occurred in the previous two adjustment periods. Moreover, the wireless communication device 10 may also reduce the amount of transmission when it is determined that congestion has occurred even in one adjustment period. Further, for example, the wireless communication device 10 may reduce the amount of transmission by a larger amount with increase in the number of last consecutive adjustment periods during which it is determined that congestion has occurred consecutively in the respective adjustment periods.

Method for Estimating the Influence

In the embodiments described above, an example in which the influence rate is estimated using average received power value or position information has been described; however, the embodiment is not limited thereto. For example, the influence rate may be estimated based on the success rate of transmission used for determination of congestion. For example, the wireless communication device 10 calculates the success rate of transmission during a data amount adjustment period and determines that the influence rate of hidden terminals are slight when the calculated success rate of transmission is higher than or equal to a threshold value. This allows estimating the influence rate of hidden terminals not only based on the distance between a wireless communication device and a gateway device but also based on the actual state of transmission, thereby increasing the reliability of the estimated influence rate.

System

Moreover, of the processing which has been described in the embodiments described above as being performed automatically, all or part of the processing may be performed manually. Alternatively, all or part of the processing which has been described as being performed manually may be performed automatically by means of a known method. In addition, the operating procedures, the control procedures, the specific designations, and the information including various data and parameters which have been described in the above embodiments and the drawings may be changed arbitrarily unless otherwise specified.

Moreover, the components of each device illustrated in the drawings are functional and conceptual component elements and do not have to be physically configured as those illustrated in the drawings. In other words, a specific configuration of distribution and integration of each device is not limited to the configuration illustrated in the drawings. That is, all or part of the component elements may be functionally or physically distributed or integrated in an arbitrary unit in accordance with various loads and conditions of use. For example, the congestion detecting section 14 and the influence estimating section 15 may be integrated. Furthermore, all or any part of the processing functions performed in each device may be implemented by a CPU and a program product analyzed and executed by the CPU or implemented as hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for transmitting data to a wireless communication device by means of carrier sense, the apparatus comprising:
    a memory to store transmission data; and
    a processor to:
        obtain a busy count indicating a number of times a communication channel has been detected to be in a busy state by repeating the carrier sense until the communication channel is detected to be in an idle state,
        estimate an influence rate at which transmission of data to a first wireless communication device is influenced by a second wireless communication device that is undetectable by means of the carrier sense by the apparatus, by calculating an average value of received powers that are detected for a wireless link coupled to the first wireless communication device during an adjustment period, wherein the second wireless communication device is located outside a first range in which direct communication with the apparatus is possible and located inside a second range in which direct communication with the first wireless communication device is possible, and the apparatus fails to keep track of a state of transmission performed by the second wireless communication device,
        determine transmission quantity that is to be transmitted to the first wireless communication device, based on the estimated influence rate,
        detect a congestion state of the first wireless communication device, based on an average value of the obtained busy count, and
        transmit data to the first wireless communication device according to the determined transmission quantity when congestion for the first wireless communication device is detected and when the communication channel is detected to be in an idle state by the carrier sense, wherein
    the processor estimates the influence rate for each of a plurality of the first wireless communication devices;
    the processor determines the transmission quantity in accordance with each of a plurality of the estimated influence rates;
    the memory stores a waiting time for performing control of the transmission quantity, in association with each of the plurality of the estimated influence rates;
    the processor determines a first waiting time associated with a first influence rate that is minimum among the plurality of the estimated influence rates;
    the processor causes transmission of, when congestion is detected for one of the plurality of the first wireless communication devices, data to the one of the plurality of the first wireless communication devices according to the transmission quantity determined in accordance with the first influence rate after the determined first waiting time has elapsed.

2. The apparatus of claim 1, wherein
the processor acquires, from the first wireless communication device, position information of the first wireless communication device;
the processor calculates a distance between the first wireless communication device and the apparatus, using position information of the first wireless communication device and position information of the apparatus; and
the processor determines the transmission quantity based on the calculated distance.

3. The apparatus of claim 1, wherein
the processor calculates, as the influence rate, a success rate of data transmission performed during a predetermined time period; and
the processor determines the transmission quantity based on the calculated success rate.

4. The apparatus of claim 1, wherein
the processor detects a number of times the busy state of the communication channel via which data transmission is performed is detected during a predetermined time period; and
the processor determines that congestion is detected for the first wireless communication device when an average value of the number of times detected during the predetermined time period exceeds a threshold value.

5. The apparatus of claim 1, wherein
the processor calculates, as the influence rate, a success rate of data transmission performed during a predetermined time period; and
the processor determines that congestion is detected for the first wireless communication device when an average value of the success rates calculated during the predetermined time period is smaller than a threshold value.

6. The apparatus of claim 1, wherein
the memory further stores a waiting time for waiting for performing control of the transmission quantity, in association with the influence rate;
the processor determines the waiting time associated with the influence rate based on the memory; and
the processor causes transmission of, when congestion is detected for the first wireless communication device, data to the first wireless communication device according to the determined transmission quantity after the determined waiting time has elapsed.

7. A method for transmitting data to a wireless communication device by means of carrier sense, the method comprising:
obtaining a busy count indicating a number of times a communication channel has been detected to be in a busy state by repeating the carrier sense until the communication channel is detected to be in an idle state,
estimating an influence rate at which transmission of data to a first wireless communication device is influenced by a second wireless communication device that is undetectable by means of the carrier sense by an apparatus performing the method, by calculating an average value of received powers that are detected for a wireless link coupled to the first wireless communication device during an adjustment period, wherein the second wireless communication device is located outside a first range in which direct communication with the apparatus is possible and located inside a second range in which direct communication with the first wireless communication device is possible, and the apparatus fails to keep track of a state of transmission performed by the second wireless communication device,
determining transmission quantity that is to be transmitted to the first wireless communication device, based on the estimated influence rate,
detecting a congestion state of the first wireless communication device, based on an average value of the obtained busy count, and
transmitting data to the first wireless communication device according to the determined transmission quantity when a congested state of the first wireless communication device is detected and when the communication channel is detected to be in an idle state by the carrier sense, wherein
the estimating of the influence rate is performed for each of a plurality of the first wireless communication devices;
the determining of the transmission quantity is performed in accordance with each of a plurality of the estimated influence rates; and
the method further comprises:
storing a waiting time for performing control of the transmission quantity, in association with each of the plurality of the estimated influence rates;
determining a first waiting time associated with a first influence rate that is minimum among the plurality of the estimated influence rates; and
causing transmission of, when congestion is detected for one of the plurality of the first wireless communication devices, data to the one of the plurality of the first wireless communication devices according to the transmission quantity determined in accordance with the first influence rate, after the determined first waiting time has elapsed.

8. A non-transitory computer readable recording medium having stored therein a program for causing a computer to execute a procedure, the computer being configured to transmit data to a wireless communication device by means of carrier sense, the procedure comprising:
obtaining a busy count indicating a number of times a communication channel has been detected to be in a busy state by repeating the carrier sense until the communication channel is detected to be in an idle state,
estimating an influence rate at which transmission of data to a first wireless communication device is influenced by a second wireless communication device that is undetectable by means of the carrier sense by the computer, by calculating an average value of received powers that are detected for a wireless link coupled to the first wireless communication device during an adjustment period, wherein the second wireless communication device is located outside a first range in which direct communication with the apparatus is possible and located inside a second range in which direct communication with the first wireless communication device is possible, and the computer fails to keep track of a state of transmission performed by the second wireless communication device,
determining transmission quantity that is to be transmitted to the first wireless communication device, based on the estimated influence rate,
detecting a congestion state of the first wireless communication device, based on an average value of the obtained busy count, and
transmitting data to the first wireless communication device according to the determined transmission quantity when congestion for the first wireless communication device is detected and when the communication channel is detected to be in an idle state by the carrier sense, wherein the estimating of the influence rate is performed for each of a plurality of the first wireless communication devices;

the determining of the transmission quantity is performed in accordance with each of a plurality of the estimated influence rates; and the procedure further comprises:

storing a waiting time for performing control of the transmission quantity, in association with each of the plurality of the estimated influence rates;

determining a first waiting time associated with a first influence rate that is minimum among the plurality of the estimated influence rates; and causing transmission of, when congestion is detected for one of the plurality of the first wireless communication devices, data to the one of the plurality of the first wireless communication devices according to the transmission quantity determined in accordance with the first influence rate, after the determined first waiting time has elapsed.

* * * * *